(12) United States Patent
Long

(10) Patent No.: US 7,529,409 B2
(45) Date of Patent: May 5, 2009

(54) 2-D ENCODED SYMBOL QUALITY ASSESSMENT

(75) Inventor: Richard G. Long, Hollis, NH (US)

(73) Assignee: Microscan Systems, Inc., Renton, WA (US)

(*) Notice: Subject to any disclaimer, the term of this patent is extended or adjusted under 35 U.S.C. 154(b) by 29 days.

(21) Appl. No.: 11/251,315

(22) Filed: Oct. 14, 2005

(65) Prior Publication Data
US 2008/0101704 A1 May 1, 2008

(51) Int. Cl.
*G06K 9/00* (2006.01)
(52) U.S. Cl. ...................... 382/205; 382/112
(58) Field of Classification Search ............ 382/112, 382/205; 250/559.01–559.49
See application file for complete search history.

(56) References Cited
U.S. PATENT DOCUMENTS 5,053,609 A * 10/1991 Priddy et al. ............. 235/436
5,124,543 A * 6/1992 Kawashima ............. 250/208.1

* cited by examiner

Primary Examiner—Samir A. Ahmed
Assistant Examiner—Mehdi Rashidian
(74) Attorney, Agent, or Firm—Morris I. Pollack

(57) ABSTRACT

An 2-D symbol orientation guide with parallel and spaced right angle guidelines with chevron-like spaces provided therebetween is selectively displayed in plural selected dispositions on a monitor screen as an overlay for the display on the same monitor screen of a 2-D Data Matrix symbol. Manual rotation of the symbol is viewed on the monitor screen as the symbols solid line border is moved into alignment with a guide line at which time the symbol is imaged and its quality graded. Display of the orientation guide in at least five selected rotational dispositions, alignment of the symbol solid line border therewith and imaging and grading of the symbol quality in each such position provides multiple grade scores for averaging into an overall grade score.

10 Claims, 4 Drawing Sheets

2-D ENCODED SYMBOL QUALITY ASSESSMENT

BACKGROUND OF THE INVENTION

1. Field of Application

This invention relates to encoded symbology; and, more particularly, to assessing or verifying, the quality of such encoded symbology after it has been applied to a carrier.

2. Description of the Prior Art

The preferred encoded identification [symbol/symbology] marking for use with this invention is the two-dimensional (2-D) matrix symbol particularly the one referred to as "DATA MATRIX".

One and two dimensional part marks have achieved wide spread acceptance throughout a wide variety of industries. 2-D matrix symbol/symbology was developed to overcome many of the deficiencies inherent in the first-generation (linear bar codes) and second-generation (stacked bar codes) symbol formats. One of the primary changes was the use of squares or rectangles as a carrier of data in lieu of the strips of variable widths used in linear and stacked bar codes. The use of data elements of known size and shape makes 2-D matrix codes more versatile. In the matrix code format, black data elements (cells) usually represent a binary "1" and white data elements (cells) usually represent a binary "0". When these binary values are used together in specific sequences, they represent alphanumeric characters. Matrix symbols can not only be produced in both square and rectangular format but they can also be scaled in size to fit into an available marking area.

Matrix codes, designed to be applied to any of a variety of articles, parts and products, are described, for example, in U.S. Pat. No. 4,939,354 (issued Jul. 3, 1990 to D. G. Priddy, et al.). A matrix code can store from one to 2335 alphanumeric characters in any language. An encoding scheme for use with such a symbol has a high degree of redundancy that permits most marking defects to be overcome. 16-bit cyclic redundancy check and data reconstruction capabilities are included in one version; and Reed-Solomon error correction is included in another. Up to 16 symbols can be concatenated. Error correction and checking (ECC) code 200 is possible.

The term "DATA MATRIX" has been certified by AIM-USA and AIM-International as a fully public-domain symbology. AIM stands for Automatic Identification Manufacturers International, Inc. "DATA MATRIX" is a unique machine readable symbol capable of storing a large amount of information within a small physical size. The data matrix symbol allows for two-dimensional encoding and decoding. Users are not constrained by the limitations of a printed symbol. Data matrix symbols are capable of carrying 25 to 100 times more information than the typical barcode. This range is directly related to the image quality the printer is capable of producing. "DATA MATRIX" codes have the following characteristics: both height and width are used to encode data; they work with contrast as low as 20%; they are readable through 360. degrees. of rotation; they are designed to survive harsh industrial environments; such codes are often printed on a substrate such as paper but they can be marked directly on the surface of a part, without using a paper label or substrate.

Some, systems and devices for reading such one and two dimensional symbols begin by determining the orientation of the markings before trying to read the symbol. Usually this is done by locating an outer reference bar(s) or a central symbol. Once the orientation of the marking is determined, the marking is read. and several error correction schemes are available to ensure damage recovery. It has, however, become important in many applications to verify the quality of the encoded symbology; including encoded symbology of the "DATA MATRIX" type.

A method for verifying "DATA MATRIX" print quality is shown and described in U.S. Pat. No. 6,244,764 patented on Jun. 12, 2001 to Ming Lei et al for "Method for Data Matrix Print Quality Verification". The method is described for verifying 2-D encoded symbology print quality on all types of direct part and label marking applications. The described method measures symbol contrast, print growth, axial non-uniformity, unused error correction, and overall grade. In addition to these parameters, the cell placement accuracy, cell size uniformity, and overall symbol quality are also measured. The method may also provide other relevant information about the data matrix, such as polarity, symbol size, error correction level, image style, and encoded data string. However, even the symbol quality indications resulting from using the method of this patent does not satisfy some industrial, commercial and/or government symbol quality requirements.

SUMMARY OF THE INVENTION

It is therefore an object of this invention to provide new and novel methods to assess the quality of encoded symbology.

It is another object of this invention to provide new and novel methods for assessing the quality of 2-D encoded symbology.

It is still another object of this invention to provide new and novel methods to assess the quality of DATA MATRIX type symbology.

It is yet another object of this invention to provide new and novel methods to assess the quality of DATA MATRIX type symbology applied either to a substrate and/or directly to parts and other articles.

It is yet still another object of this invention to provide new and novel methods to assess the quality of DATA MATRIX type encoded symbology sufficient to satisfy and comply with industrial, commercial and government standards.

It is yet still another object of this invention to provide new and novel methods to facilitate multiple positioning of a carrier upon which there is a 2-D encoded symbol to assess the quality of the 2-D symbol.

Other objects, features and advantages of the invention in its details of construction and arrangement of elements and systems will be seen from the above and from the following description of the preferred embodiments when considered in conjunction with the accompanying drawings and appended claims.

DESCRIPTION OF THE INVENTIVE EMBODIMENTS

Figure 1:
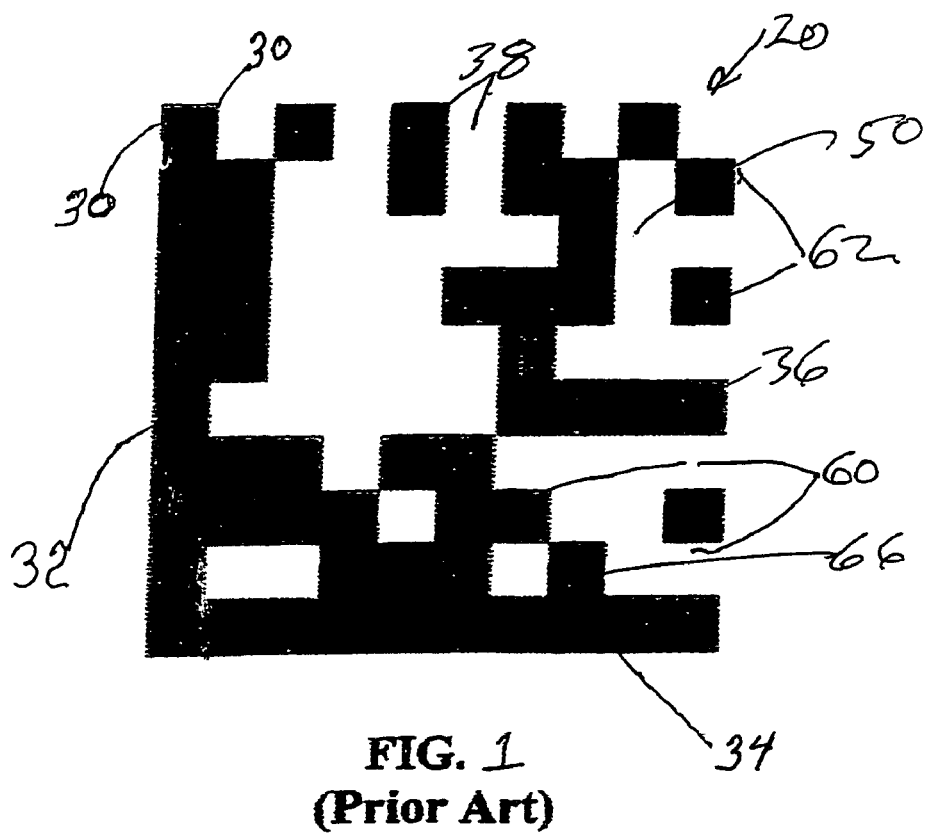
FIG. 1 is a Prior Art schematic of a 2-D encoded symbology of the "DATA MATRIX" type.

With reference to FIG. 1, there is generally shown at 20 the basic components of a 2-D (two-dimensional) "DATA MATRIX"-type encoded symbol. Although symbol 20 has been shown with a square configuration, it may just as well have any other convenient regular configurations such as a rectangle. A border 30 is provided for symbol 20 and includes a first solid border 32 that extends in a first direction and a second solid border 34 that extends in a second direction perpendicular (at a right angle) to first border 32. Border 30 also includes a first broken border 36 that extends in a direction parallel but spaced from first solid border 32 and a second broken border 38 that extends in a direction parallel but spaced from second solid border 34. A data field 50 is provided within the space surrounded by border 30.

Conventional computer software for decoding encoded "DATA MATRIX"-type symbol 20 utilizes solid borders 32, 34 to determine the physical size (length "x" and width "y") of symbol 20. It should be noted that broken borders 36, 38 comprise alternate light border cells 60 and dark border cells 62. Conventional computer software utilizes these broken border cells 60, 62 to determine the number of rows and columns of cells to thereby determine the number of cells allocated to data field 50. Data encoding is accomplished by conventional computer software. Data cells 66, of symbol 20, are differentiated for encoding purposes in a conventional manner to provide some such cells 66 to include black cell elements representing binary "1" and white cell elements representing binary "0". It should be understood, nevertheless, that white cell elements might just as well represent binary "1" while black cell elements represent binary "0". Contrasting colors other than black and white may also be utilized as long as the imaging device and computer software can differentiate same between binary "1" representing cell elements and binary "0" representing cell elements. Similarly solid border cells 32, 34 and broken border cells 36, 38 are thus differentiated by contrasting black and white colors; while other contrasting colors may also be utilized.

Figure 2:
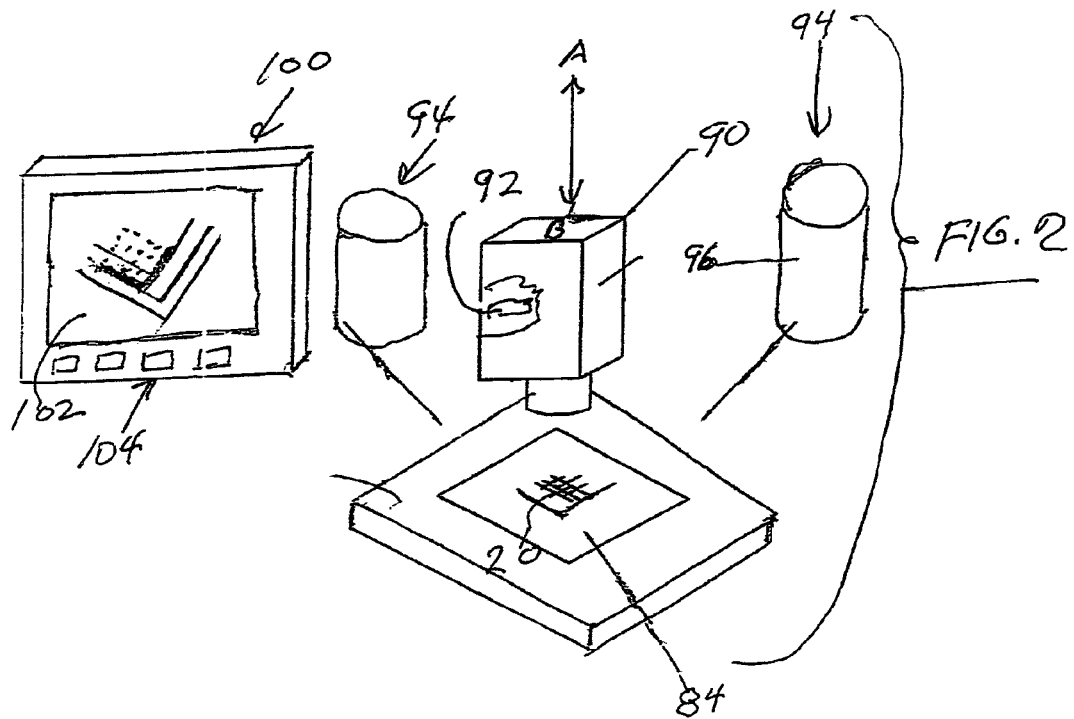
FIG. 2 s a schematic arrangement of components for accomplishing the new and novel quality assessment of 2-D symbology and which incorporate the instant invention.
Figure 3:
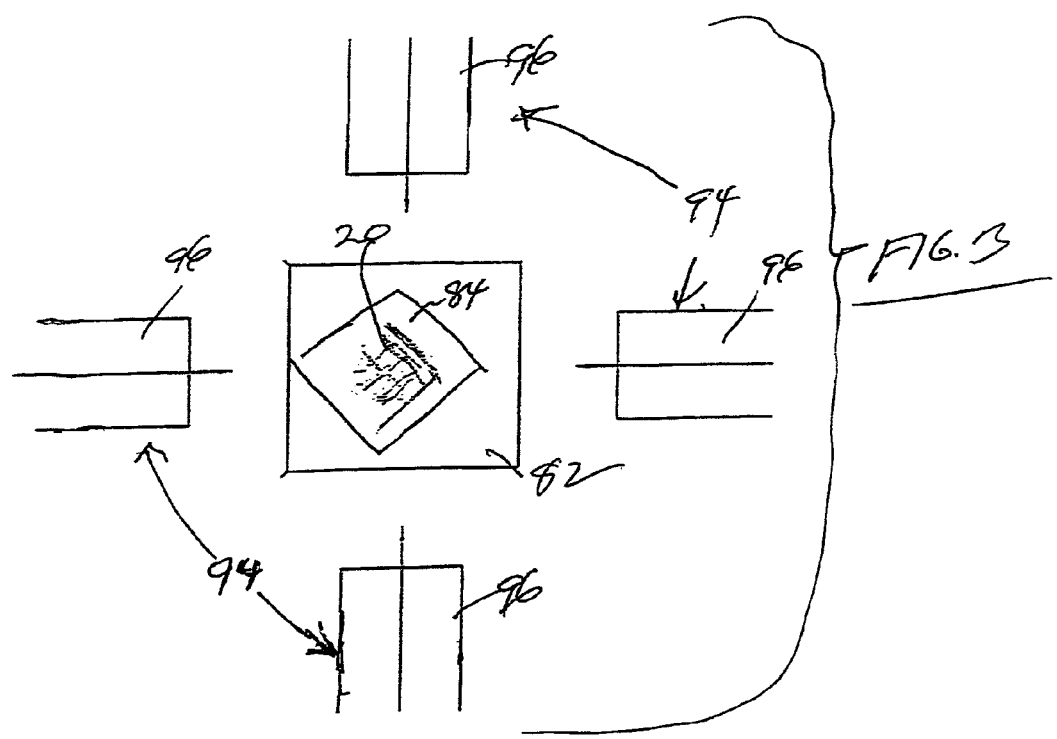
FIG. 3 is a schematic plan view of the arrangement of some of the components of FIG. 2.

In the component arrangement 80 of FIGS. 2 and 3 a support 82 is provided to receive an article 84 upon which there is disposed a "DATA MATRIX" 2-D encoded symbol such as symbol 20. Article 84 may be any conventional substrate such as paper, plastic, or the like, or it may be a component, part or other direct marked article. Symbol 20 may be printed by conventional techniques with available equipment and systems or it may be directly applied by dot peening, casting, forging or other methods. Article 84 is positioned on support 82 within the field of view of a conventionally available camera 90 suitable for symbol imaging purposes and mounted for selective up (in the direction of arrow A-FIG. 2) and down (in the direction of arrow B) movement. A light sensitive image sensing array 92 (FIG. 1), which may be of the CCD, CMOS or other conventionally available and suitable type, is disposed within camera 90. A source of illumination 94 is provided to adequately illuminate symbol 20 for imaging purposes upon light sensitive array 92 of camera 90. While illumination source 94 has been shown as comprising a number of point lights 96, disposed one in each quadrant, such illumination source 94 may just as well be a suitable ring light. Illumination source 94 might best be selected to provide illumination at 660 nanometers wavelength; but other suitable and appropriate wavelengths may just as well be selected. A conventionally available computer 100 (FIGS. 2, 4, 5, 6, 7 & 8)) is suitably powered and connected or otherwise integrated with camera 90 to receive images therefrom and display such images upon a screen 102 of a monitor 104. Monitor 104 may be part of the computer or a separate component conventionally and suitably connected to the computer.

It is important in determining the quality assessment for a 2-D symbol, especially of the "DATA MATRIX" type, to take into consideration the effects of variations in apparent symbol characteristics. Doing so in a number of different and selected orientations, relative to the axis of the measuring device, of the symbol whose symbol quality is being assessed, and averaging the obtained quality grades derived from the respective selected symbol orientations, provides for a quality assessment more suitable for some industrial, commercial and government purposes. Basing the measurement and grading of parameters of a reference gray-scale image, the binarised image derived from it and the application of the reference decode algorithm to selected defined other parameters is acceptable for two dimensional symbol quality assessment and can be accomplished by utilizing a system such as that of U.S. Pat. No. 6,244,764 previously referred to. Quality grading of these parameters may then be used to provide a relative measure of symbol quality under the measurement conditions used. Each parameter is to be measured and a grade on a descending scale of integers from 4 to 0 may be allocated to it; grade 4 representing the highest quality and grade 0 representing failure.

The area within which the above described measurements are to be made is a rectangular area framing the complete symbol 20, including its quiet zones. The centre of the inspection area is to be as close as practicable to the centre of the field of view of camera 90. The inspection area is not to be the same as the field of view of the verifier, which is to be sufficiently large to include the whole symbol 20 plus a 20% extension in at least one of the orientations for symbol 20.

In order to provide for the effects of variations in apparent symbol characteristics symbol 20 is to be viewed in different orientations relative to the axis of the measuring device and to provide a basis for averaging grades (compass type orientations are utilized to facilitate describing the instant method). The quality measurement method described provides for five measurements of symbol 20 with an appropriate measuring aperture for camera 90 and source of illumination 94. Symbol 20 is to be rotated to selected imaging positions in increments of 72 degrees, + or −5 degrees, around the optical axis of camera 90 and a quality measurement taken at each position. The first position is to be with the vertical axis of symbol 20 oriented at 45 degrees, + or −5 degrees, to the vertical axis of light sensitive array 92. An overall symbol grade is to be determined by averaging the quality grades of the individual images, taken at the selected positions While five selected imaging positions have been selected it is contemplated that as little as 4 selected grading positions are possible for an average and additional grading positions for symbol 20, such as 8 by way of example, may also be used and averaged, depending on industrial, commercial and/or government intentions and requirements.

A 2-D symbology orientation guide 120, incorporating the instant invention, is provided to facilitate rotational positioning of symbol 20, for which the quality is to be assessed, into selected imaging and grading positions for symbol 20. Guide 120 is provided with a number of guide lines 130 (FIGS. 4-8) each of which meets at right angles with guide lines 132. Guide lines 130, 132 are selected to be at least as long as solid borders 32, 34 of symbol 20. and are disposed in parallel and spaced positions with respect to adjacent guide lines. Spaces 140, 142 of right angle, chevron-like configuration are formed between adjacent guide lines 130, 132. The width of chevron stripes or spaces 140, 142 may be selected to be at least as wide as the thickness of solid borders 32, 34 of symbol 20 and preferably somewhat wider as will be explained hereinafter.

As stated above symbol 20 is to be imaged and graded in multiple rotationally orientated positions and the respective assessment grades for each such position averaged to provide an overall quality grade assessment. Orientation guide 120 is, preferably, to be generated on screen 102 as an overlay for a symbol 20, to be imaged and have its quality assessed, when such symbol 20 is disposed on support 82 in the field of view of camera 90, illuminated by illumination source 94 and imaged by camera 90 as symbol 20 is rotated to and through its selected grading positions. It should be understood, nevertheless, that orientation guide 120 may just as well be otherwise provided, such as by a see-through appropriately marked template rotationally and selectively positioned over screen 102 and through which symbol 20, appearing on screen 102, may be positioned and viewed as it is moved to and through its selected rotational positions.

Figure 4:
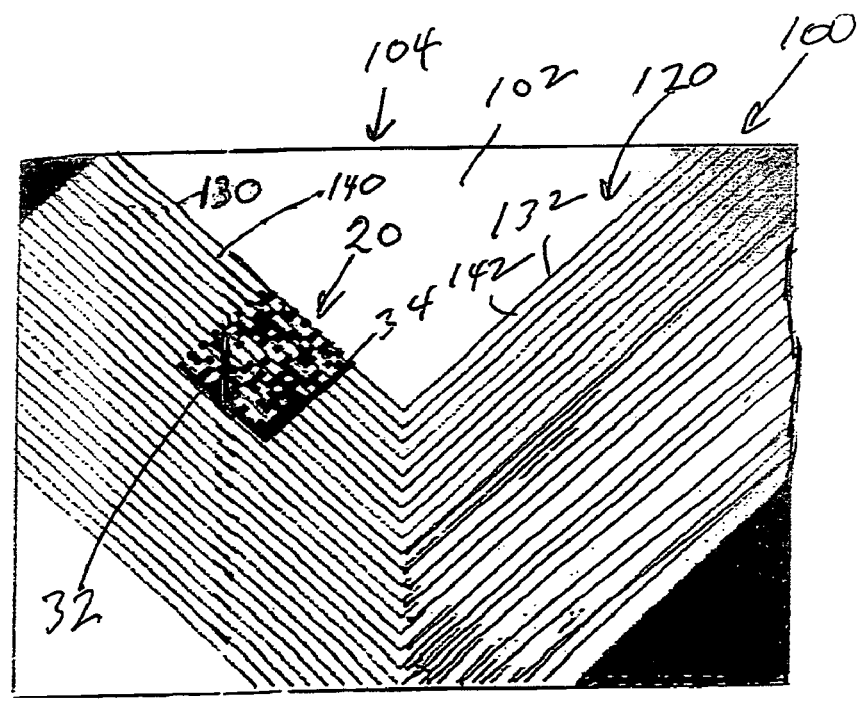
FIG. 4 is a schematic view of a computer monitor screen showing a "DATA MATRIX" type symbol from a carrier in a predetermined disposition with respect to a symbol orientation guide incorporating the instant invention.
Figure 5:
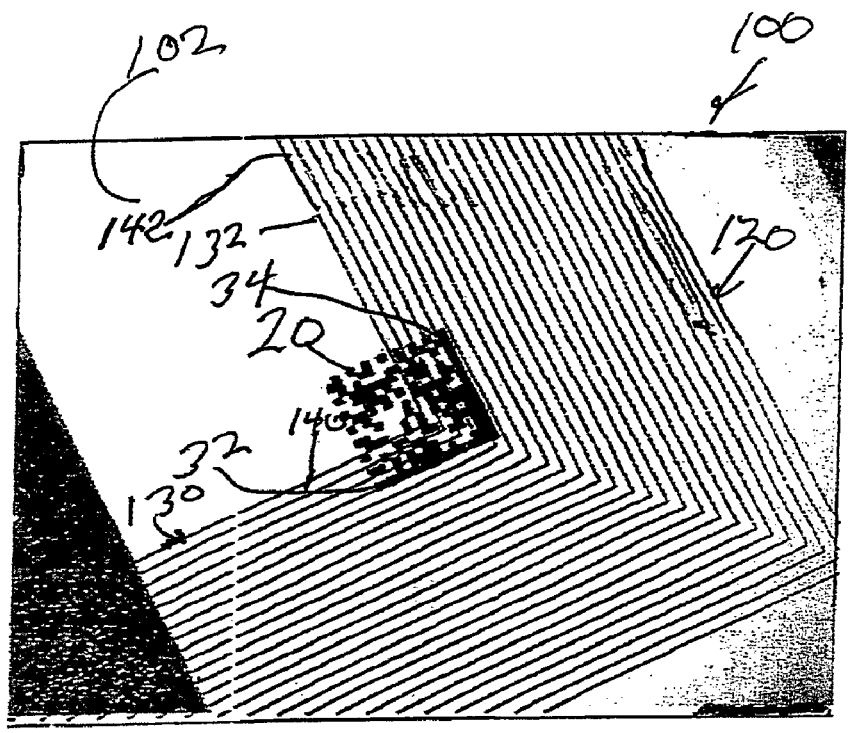
FIG. 5 is a schematic view of a computer monitor screen, similar to that of FIG. 4, but showing the "DATA MATRIX" symbol and symbol orientation guide of FIG. 4 in another predetermined disposition.

A first imaging/grading position for a symbol 20 is selected to be at 45 degrees. Orientation guide 120 is initially displayed on screen 102 with its guide lines 130 and chevron stripes 140 in their respective 45 degree positions, as shown in FIG. 4. An article 84 with its symbol 20 is placed on support 82 (FIGS. 1 & 2) illuminated by illumination source 94 and in the field of view of camera 90 Article 82 is rotated counterclockwise (direction of arrow A FIGS. 1 & 2) and symbol 20 appears on screen 102 with orientation guide 120 as an overlay, also on screen 102, as article 82 and its symbol 20 are so rotated. Rotation of article 82 is continued until solid border 32 of symbol 20 aligns with guide lines 130, (FIG. 4) and/or until its solid border 32 is within a chevron space 140. Substantial alignment of solid border 32 of symbol 20 within a chevron space 140 may also be acceptable if the chevron spaces 140 are selected at a width that permits a canted but substantial alignment of border 32 with a guide line 130 while maintaining the + or −5 degree range. When so aligned camera 90 and its associated image reader may be activated, by conventional means, to not only image symbol 20 but also to subject the image to quality verification and grading with the results being appropriately stored for averaging and orientation guide 120 automatically re-oriented to appear on screen 102 in its 117 degree overlay position (FIG. 5.).

When the image reader is activated as described above and as herinafter described for all orientation positions of symbol 20, the reader will first check that the measured angle of orientation of symbol 20 is within the allowable tolerance of angularity; before initiating the verification and grading process. If the orientation of symbol 20 is within the allowable tolerance of angularity the verification and grading process will be initiated. If the orientation of symbol 20 is not within the allowable tolerance of angularity the user will be prompted to try again.

Figure 6:
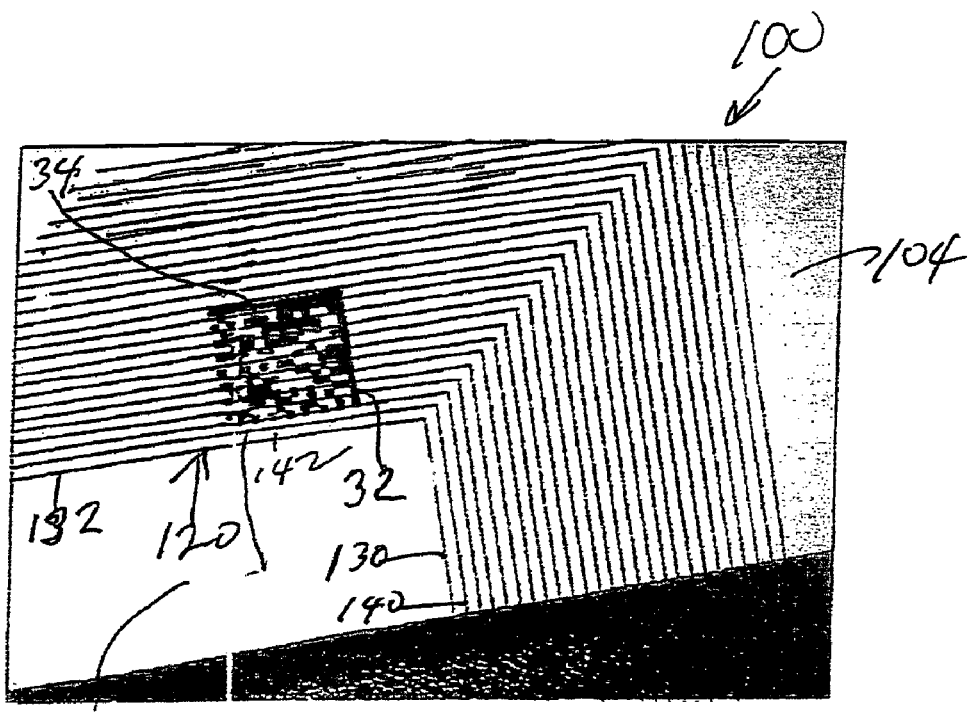
FIG. 6 is a schematic view of a computer monitor screen, similar to that of FIGS. 4 & 5 but showing the "DATA MATRIX" symbol and symbol orientation guide of FIGS. 4 & 5 in another predetermined disposition.

A second imaging/grading position for a symbol 20 is selected to be at 117 degrees; + or −5 degrees. Orientation guide 120 has been automatically re-oriented to appear on screen 102 in its 117 degree position and as overlay for symbol 20 (FIG. 5.). Article 82 is again rotated counterclockwise (in the direction of arrow A FIGS. 1 & 2) and appears on screen 102 with orientation guide 120 as its overlay, also on screen 102, as article 82 and its symbol 20 are so rotated. Rotation of article 82 and its symbol 20 is continued and viewed on screen 120 until solid border 32 of symbol 20 aligns with guide lines 130 in their 117 degree positions and/or until solid border 32 of symbol 20 is within a chevron space 140. Here again substantial alignment of solid border 32 of symbol 20 within a chevron space 140 is also acceptable as described above for the 45 degree positioning. When so aligned camera 90 and its associated image reader will be activated, by conventional means, when the reader determines that the measured angle of orientation of symbol 20 is within the allowable tolerance of angularity as described above, to not only image symbol 20 but also to subject the image of symbol 20 to quality verification and grading with the results being appropriately stored for averaging and orientation guide 120 is automatically re-oriented to appear on screen 102 in its 189 degree overlay position (FIG. 6.).

Figure 7:
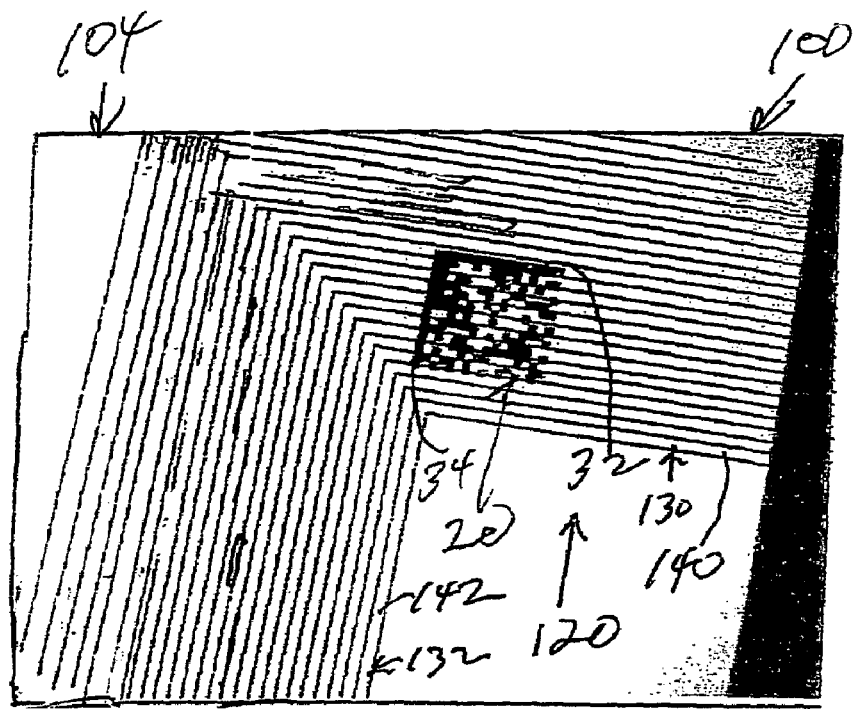
FIG. 7 is a schematic view of a computer monitor screen, similar to that of FIGS. 4-6 but showing the "DATA MATRIX" symbol and symbol orientation guide of FIG. 4-6 in yet another predetermined disposition.

A third imaging/grading position for a symbol 20 is selected to be at 189 degrees; + or −5 degrees. Orientation guide 120 has been automatically re-oriented to appear on screen 102 in its 189 degree position and as overlay for symbol 20 (FIG. 6.). Article 82 is again rotated counterclockwise (in the direction of arrow A FIGS. 1 & 2) and appears on screen 102 with orientation guide 120 as its overlay, also on screen 102, as article 82 and its symbol 20 are so rotated. Rotation of article 82 and its symbol 20 is continued and viewed on screen 120 until solid border 32 of symbol 20 aligns with guide lines 130, in their 189 degree positions and/or until solid border 32 of symbol 20 is within a chevron space 140. Here again substantial alignment of solid border 32 of symbol 20 within a chevron space 140 is also acceptable as described above for the 45 and 117 degree positioning. When so aligned camera 90 and its associated image reader will be activated, by conventional means, when the reader determines that the measured angle of orientation of symbol 20 is within the allowable tolerance of angularity as described above, to not only image symbol 20 but also to subject the image of symbol 20 to quality verification and grading with the results being appropriately stored for averaging and orientation guide 120 is automatically re-oriented to appear on screen 102 in its 261 degree overlay position (FIG. 7).

Figure 8:
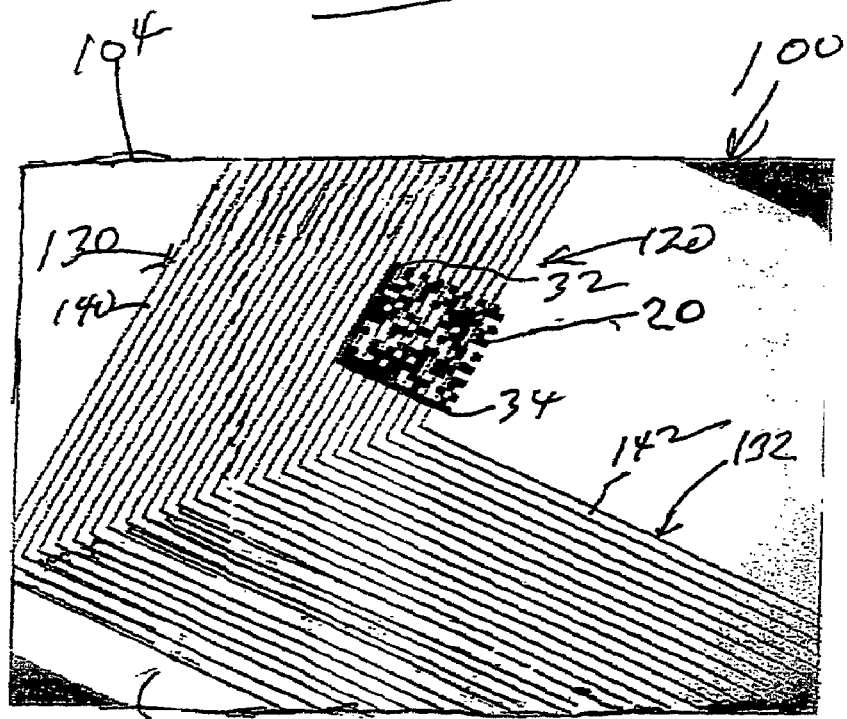
FIG. 8 is a schematic view of a computer monitor screen, similar to that of FIGS. 4-7, but showing the "DATA MATRIX" symbol and symbol orientation guide of FIG. 4-7 in still another predetermined disposition.

A fourth imaging/grading position for a symbol 20 is selected to be at 261 degrees; + or −5 degrees. Orientation guide 120 has been automatically re-oriented to appear on screen 102 in its 261 degree position and as overlay for symbol 20 (FIG. 7.). Article 82 is again rotated counterclockwise (in the direction of arrow A FIGS. 1 & 2) and appears on screen 102 with orientation guide 120 as its overlay, also on screen 102, as article 82 and its symbol 20 are so rotated. Rotation of article 82 and its symbol 20 is continued and viewed on screen 120 until solid border 32 of symbol 20 aligns with guide lines 130 in their 261 degree positions and/or until solid border 32 of symbol 20 is within a chevron space 140. Here again substantial alignment of solid border 32 of symbol 20 within a chevron space 140 is also acceptable as described above for the 45, 117, and 189 degree positioning. When so aligned camera 90 and its associated image reader will be activated, by conventional means, when the reader determines that the measured angle of orientation of symbol 20 is within the allowable tolerance of angularity as described above, to not only image symbol 20 but also to subject the image of symbol 20 to quality verification and grading with the results being appropriately stored for averaging and orientation guide 120 is automatically re-oriented to appear on screen 102 in its 333 degree overlay position (FIG. 8.).

A fifth imaging/grading position for a symbol 20 is selected to be at 333 degrees; + or −5 degrees. Orientation guide 120 has been automatically re-oriented to appear on screen 102 in its 261 degree position and as overlay for symbol 20 (FIG. 8.). Article 82 is again rotated counterclockwise (in the direction of arrow A FIGS. 1 & 2) and appears on screen 102 with orientation guide 120 as its overlay, also on screen 102, as article 82 and its symbol 20 are so rotated. Rotation of article 82 and its symbol 20 is continued and viewed on screen 120 until solid border 32 of symbol 20 aligns with guide lines 130 in their 333 degree positions and/or until solid border 32 of symbol 20 is within a chevron space 140. Here again substantial alignment of solid border 32 of symbol 20 within a chevron space 140 is also acceptable as described above for the 45, 117, 189 and 261 degree positioning. When so aligned camera 90 and its associated image reader will be activated, by conventional means, when the reader determines that the measured angle of orientation of symbol 20 is within the allowable tolerance of angularity as described above, to not only image symbol 20 but also to subject the image of symbol 20 to quality verification and grading with the results being appropriately stored for averaging.

When all the selected rotative positions have been imaged and graded for symbol 20 an average grade is determined. And thereafter utilized for the intended purposes.

There may be situations where symbol 20, or article 82 upon which symbol 20 appears, are of a size that is too large for the positioning, imaging and assessment components as described above. In such situations the imaging and assessment components may be mounted for portable utilization. Instead of the article and symbol carried thereby being rotationally positioned the camera may be rotationally positioned to the selected 45, 117, 169, 261 and 333 degree positions, or whatever other selected rotational positions are selected. A symbol orientation guide, similar to guide 120, is still to be utilized as on overlay to the symbol as it appears on the screen and is rotationally positioned as seen on a monitor as described hereinabove. Symbol imaging, verification and grading will be accomplished as described above with respect to that of FIGS. 4-8.

It is understood that although there has been shown and described preferred embodiments of the invention that various modifications may be made in the details thereof without departing from the spirit as comprehended by the following claims.

What is claimed is:

1. A method of assessing the quality of a 2-D (two dimensional) matrix type encoded symbol having at least a pair of solid border lines which meet at a right angle, the method comprising:
    utilizing a light sensitive image sensing array and a monitor screen;
    (a) positioning the 2-D matrix type encoded symbol to be imaged by a light sensitive array;
    (b) displaying an image of the 2-D matrix type encoded symbol on the monitor screen;
    (c) providing an orientation guide as an overlay for the monitor screen and the 2-D matrix type encoded symbol when so displayed on the monitor screen;
    (d) providing said orientation guide with a predetermined number of substantially right angle configured guide lines which are parallel to each other to provide chevron-like spaces between adjacent guide lines;
    (e) positioning said orientation guide so that said guide lines and chevron-like spaces are disposed at-least at a first rotational disposition when viewed on the monitor screen;
    (f) orienting the 2-D matrix type encoded symbol to be viewed on the monitor screen while being oriented and with respect to the guide lines on the orientation guide, as displayed on the monitor screen, to align at least one of the solid border lines of the 2-D matrix type encoded symbol with the guide lines and chevron like-spaces of the orientation guide;
    (g) imaging, and assessing the grade of the 2-D matrix type encoded symbol when so aligned;
    (h) re-orienting the orientation guide and 2-D matrix type encoded symbol into a selected number of additional rotational positions and imaging and assessing the grade of the symbol at each such rotational position; and
    (i) averaging the grades of all the selected positions to assess the quality of the 2-D matrix type encoded symbol.

2. The method of claim 1 including positioning said orientation guide so that said guide lines and chevron-like spaces are sequentially disposed at a plurality of rotational dispositions when viewed on the monitor screen and orienting, aligning, imaging and grading the 2-D symbol at each such position and averaging the respective scores.

3. The method of claim 2 wherein there are five such rotational dispositions.

4. The method of claim 3 including so locating the orientation guide and 2-D symbol at 45 degrees, 117 degrees, 189 degrees, 261 degrees and 333 degrees with respect to a vertical axis of the light sensitive array.

5. The method of claim 4 wherein the orientation guide is computer generated and oriented.

6. The method of claim 2 wherein there are at least four such rotational dispositions with each disposition in a different quadrant of rotational disposition.

7. The method of claim 1 wherein the 2-D encoded matrix type symbol is a Date Matrix encoded symbol.

8. The method of claim 7 wherein the 2-D symbol is manually oriented between its selected dispositions and the light sensitive array is carried by a camera.

9. The method of claim 8 further including providing an illumination source for illuminating the 2-D symbol at least while being oriented and imaged.

10. The method of claim 1 including rotationally orienting the light sensitive array while leaving the 2-D symbol in a stationary disposition and viewing the image of the 2-D symbol With respect to the orientation guide in selected dispositions.

* * * * *